No. 759,657. Patented May 10, 1904.

UNITED STATES PATENT OFFICE.

AUGUSTUS BISCHLER, OF BASLE, SWITZERLAND, ASSIGNOR TO BASLE CHEMICAL WORKS, OF BASLE, SWITZERLAND, A FIRM.

RED BASIC RHODAMIN DYE AND PROCESS OF MAKING SAME.

SPECIFICATION forming part of Letters Patent No. 759,657, dated May 10, 1904.

Application filed February 19, 1904. Serial No. 194,389. (No specimens.)

*To all whom it may concern:*

Be it known that I, AUGUSTUS BISCHLER, doctor of philosophy and chemist, a subject of the Emperor of Russia, and a resident of Basle, Switzerland, have invented new and useful Improvements in the Manufacture of Basic Dyestuffs, of which the following is a clear and complete specification.

I have found that by heating the rhodamin bases (phtaleins of meta-amido-phenol and its derivatives) with derivatives of halogenated fatty acids new red basic dyestuffs are obtained which are easily soluble in water and well suited for dyeing cotton, silk, and wool. The new dyestuffs are obtained in a smooth manner by heating the rhodamin bases with the derivatives of halogenated fatty acids alone or in presence of a diluent, such as alcohol, glycerin, &c.

Example: 3.750 kilos unsymmetrical dimethyl-methyl-rhodamin-base, (produced from one molecule dimethyl-amido-oxybenzoyl-benzoic acid and one molecule m-amidocresol according to United States Letters Patent No. 578,578,) together with the same weight of alcohol and one kilo chloracetamid, (ClCH$_2$CONH$_2$,)

are heated gradually while stirring to 130° centigrade, whereby the alcohol is distilled off. As soon as a test of the dyestuff is completely soluble in water the mixture is left to cool and the product, which has become firm, is pulverized. The rhodamin dyestuff thus obtained may be used for dyeing purposes without further treatment. If glycerin is used as a diluent, the reaction product is dissolved in water and the dyestuff is precipitated by means of a common-salt solution, filtered, and dried.

The new dyestuff produced according to the above example is easily soluble in water with a red coloration and may be easily precipitated from the aqueous solution as a dark-red mass by means of hydrochloric acid or common salt. It constitutes in dry state a greenish-red crystalline powder, and its aqueous solutions show a slight fluorescence. If the aqueous solution of the dyestuff is mixed with soda-lye, (caustic soda,) the base of the new dyestuff is precipitated. By heating with an excess of soda-lye ammonia is developed.

In exactly the same manner as from the above unsymmetrical rhodamin base, which contains a primary amido group, new dyestuffs easily soluble in water may also be obtained from all other rhodamin bases of the phtalic-acid series, as well as of the succinic-acid series. Similar dyestuffs result if the rhodamin bases are heated with alkylated chloracetamids—as, for instance, chloracedimethylamid

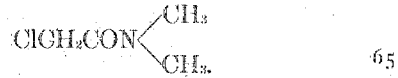

Dyestuffs possessing the same properties are also produced by heating the rhodamin bases with chloracetic ethyl-ether (ethyl-chloracetate) ClCH$_2$.CO.OC$_2$H$_5$. Quite analogous dyestuffs are likewise obtained if the rhodamin bases instead of being heated with the above-named derivatives of chloracetic acid are heated with similar derivatives of another halogenated fatty acid.

What I claim is—

1. The described process for the manufacture of new basic rhodamin dyestuffs by heating rhodamin bases with derivatives of halogenated fatty acids.

2. The described process for the manufacture of new basic rhodamin dyestuffs by heating rhodamin bases with derivatives of chloracetic acid.

3. The described process for the manufacture of new basic rhodamin dyestuffs by heating rhodamin bases with chloracetamid.

4. As new products, the basic rhodamin dyestuffs derived from rhodamin bases and derivatives of halogenated fatty acids and constituting in dry state greenish-red crystalline powders, easily soluble in water to a reddish and fluorescing solution and dyeing cotton, silk and wool red tints, as described.

5. As new products the basic rhodamin dyestuffs derived from rhodamin bases and chloracetamid, constituting in dry state greenish-red crystalline powders, easily soluble in water to a reddish and fluorescing solution, dyeing cotton, silk and wool red tints and developing ammonia on heating with soda-lye.

6. As a new article of manufacture the basic rhodamin dyestuff derived from the herein-specified unsymmetrical dimethyl-methyl-rhodamin base and chloracetamid, constituting in dry state, a greenish-red crystalline powder, easily soluble in water giving a red solution of a slight fluorescence, dyeing cotton, silk and wool red tints and developing ammonia on heating with soda-lye.

In witness whereof I have hereunto signed my name, this 1st day of February, 1904, in the presence of two subscribing witnesses.

AUGUSTUS BISCHLER.

Witnesses:
 GEO. GIFFORD,
 AMAND RITTER.